United States Patent
Dolev et al.

(10) Patent No.: US 8,103,749 B2
(45) Date of Patent: Jan. 24, 2012

(54) METHOD AND APPARATUS FOR MANAGING COMMUNICATIONS

(75) Inventors: Danny Dolev, Mevaseret Zion (IL); Shay Horovitz, Rishon LeZion (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 747 days.

(21) Appl. No.: 11/794,766

(22) PCT Filed: Jan. 5, 2006

(86) PCT No.: PCT/IL2006/000018
§ 371 (c)(1), (2), (4) Date: Jul. 5, 2007

(87) PCT Pub. No.: WO2006/072949
PCT Pub. Date: Jul. 13, 2006

(65) Prior Publication Data
US 2008/0028055 A1    Jan. 31, 2008

Related U.S. Application Data

(60) Provisional application No. 60/641,131, filed on Jan. 5, 2005.

(51) Int. Cl.
*G06F 15/177* (2006.01)
(52) U.S. Cl. ......... 709/221; 709/220; 709/222; 709/245
(58) Field of Classification Search .................. 709/238, 709/200, 245, 220–222
See application file for complete search history.

(56) References Cited

U.S. PATENT DOCUMENTS

| | | | | |
|---|---|---|---|---|
| 5,774,660 | A * | 6/1998 | Brendel et al. | 709/201 |
| 6,138,162 | A * | 10/2000 | Pistriotto et al. | 709/229 |
| 6,389,419 | B1 * | 5/2002 | Wong et al. | 709/245 |
| 6,415,329 | B1 * | 7/2002 | Gelman et al. | 709/245 |
| 7,080,158 | B1 * | 7/2006 | Squire | 709/245 |
| 7,127,613 | B2 * | 10/2006 | Pabla et al. | 713/171 |
| 7,454,489 | B2 * | 11/2008 | Chauffour et al. | 709/223 |
| 7,650,427 | B1 * | 1/2010 | Liu et al. | 709/238 |
| 2003/0074467 | A1 * | 4/2003 | Oblak et al. | 709/238 |
| 2003/0126056 | A1 * | 7/2003 | Hausman et al. | 705/36 |
| 2003/0149787 | A1 * | 8/2003 | Mangan | 709/238 |
| 2003/0200311 | A1 * | 10/2003 | Baum | 709/224 |
| 2004/0267875 | A1 * | 12/2004 | Hennessey et al. | 709/200 |
| 2006/0023654 | A1 * | 2/2006 | Koren et al. | 370/325 |
| 2010/0121932 | A1 * | 5/2010 | Joshi et al. | 709/207 |

* cited by examiner

*Primary Examiner* — Firmin Backer
*Assistant Examiner* — Brian P Whipple
(74) *Attorney, Agent, or Firm* — Dorsey & Whitney LLP

(57) ABSTRACT

The present invention provides a method and an apparatus for managing communications arriving from or to a node connected to a specified portion of a network. Some embodiments relate to an apparatus for managing communications arriving from or to a node connected to a specified portion of a network, including an external link identifier, a pool of addresses and an address replacement module. The external link identifier is configured to identify a message which is configured to enable requested content to be exchanged between the node and at least one other node which is external to the specified portion of the network. The pool of addresses is adapted to implement content insensitive criteria for determining which addresses to include in the pool. The address replacement module is adapted to implement a content insensitive replacement policy for determining whether an address included in the identified message should be replaced.

57 Claims, 4 Drawing Sheets

| Entry No. | Hash Value | Timestamp | Counter |
|---|---|---|---|
| 1. | DCD34 | 10:45:23.005 | 3 |
| 2. | ... | | |
| 3. | | | |
| 4. | | | |
| 5. | | | |
| 6. | | | |
| 7. | ... | | |
| 8. | 5ED8E | 10:45:23.075 | 4 |
| 9. | 43528 | 10:45:24.123 | 1 |

FIG. 3

METHOD AND APPARATUS FOR MANAGING COMMUNICATIONS

CROSS-REFERENCE

This is a National Phase Application filed under 35 U.S.C. 371 of International Application No. PCT/IL2006/000018, filed Jan. 5, 2006, claiming the benefit under 35 USC 119(e) of U.S. Provisional Application No. 60/641,131, filed Jan. 5, 2005, the entire contents of each of which is hereby incorporated herein by reference in its entirety.

FIELD OF THE INVENTION

This invention relates to management of communications associated with a specific portion of a network.

BACKGROUND OF THE INVENTION

In its early days, the Internet was used to transport fairly homogeneous and relatively light textual content between computers. Since then, the Internet has become an extremely diverse platform which is used to transfer a myriad of different types of content in a variety of formats. Today, bandwidth intensive content, such as media files, for example, traverses the Internet alongside relatively light content, such as text and simple graphics.

Peer to peer (P2P) technology is a major contributor to the dramatic rise in the amount of bandwidth intensive content being exchanged over the Internet. P2P services, such as KazaaA™, eDonkey™/eMule™, Gnutella™ and BitTorrent™ are believed to be responsible for approximately 60% (percent) of all Internet traffic.

Internet Service Providers (ISPs) as an example of organizations which maintain a group of computers or nodes that form a specified portion of a network, typically pay for external links (links with nodes located outside the specified portion of the network). Thus, P2P traffic, being associated with content intensive traffic, is a significant contributor to the operating costs of ISPs and has become a heavy financial burden on the shoulders of the ISPs.

If ISPs were provided with effective means for reducing the operating expenses associated with P2P traffic, their profitability would increase. Such solutions need to maintain a relatively high quality of service level due to the popularity and demand of P2P services. Therefore simply blocking P2P traffic is not feasible.

In an attempt to provide effective means for reducing the operating expenses associated with certain types of traffic, such as P2P traffic, several solutions have been suggested. However, prior art solutions expose the ISP to the content of the communication and in particular to the content of P2P communications, and some solutions even involve storing (caching) data which is associated with (or refers to) the content of the P2P communications. Exposure to the content of the P2P communications may impose considerable liabilities on the ISP, for example, in lieu copyright infringement.

SUMMARY OF THE INVENTION

Thus, there is a need for a method, a system and an apparatus for content insensitive management of communications arriving from or to a node connected to a specified portion of a network. It is further needed to provide a method, a system and a apparatus for managing communications arriving from or to a node connected to a specified portion of a network without being exposed to the content of the communications and without being required to store or cache any data which is associated with or including reference to the content of the communications.

The present invention provides a method and an apparatus for managing communications arriving from or to a node connected to a specified portion of a network, the apparatus comprising. Some embodiments of the present invention relate to an apparatus for managing communications arriving from or to a node connected to a specified portion of a network including an external link identifier, a pool of addresses and an address replacement module. The external link identifier is configured to identify a message which is configured to enable requested content to be exchanged between the node and at least one other node which is external to the specified portion of the network. The pool of addresses is adapted to implement content insensitive criteria for determining which addresses to include in the pool. The address replacement module is adapted to implement a content insensitive replacement policy for determining whether an address included in the identified message should be replaced, such that if in accordance with the replacement policy it is determined that the address should be replaced, a replacement address is selected from the pool of addresses.

Further embodiments of the invention relate to an apparatus for managing communications arriving from or to a node connected to a specified portion of a network including an external link identifier, a pool of internal addresses and an address replacement module. The external link identifier is configured to identify a message which is configured to enable requested content to be exchanged between the node and at least one other node which is external to the specified portion of the network. The pool of addresses is adapted to implement content insensitive criteria for determining which internal addresses to include in the pool. The address replacement module is adapted to implement a content insensitive replacement policy for determining whether an external address included in the identified message should be replaced, such that if in accordance with the replacement policy it is determined that the external address should be replaced, a internal replacement address is selected from the pool of internal addresses.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 is a graphical illustration of a hash table which may be used by the address replacement module to store data with respect to identified messages, according to some embodiments of the invention.

Figure 1:
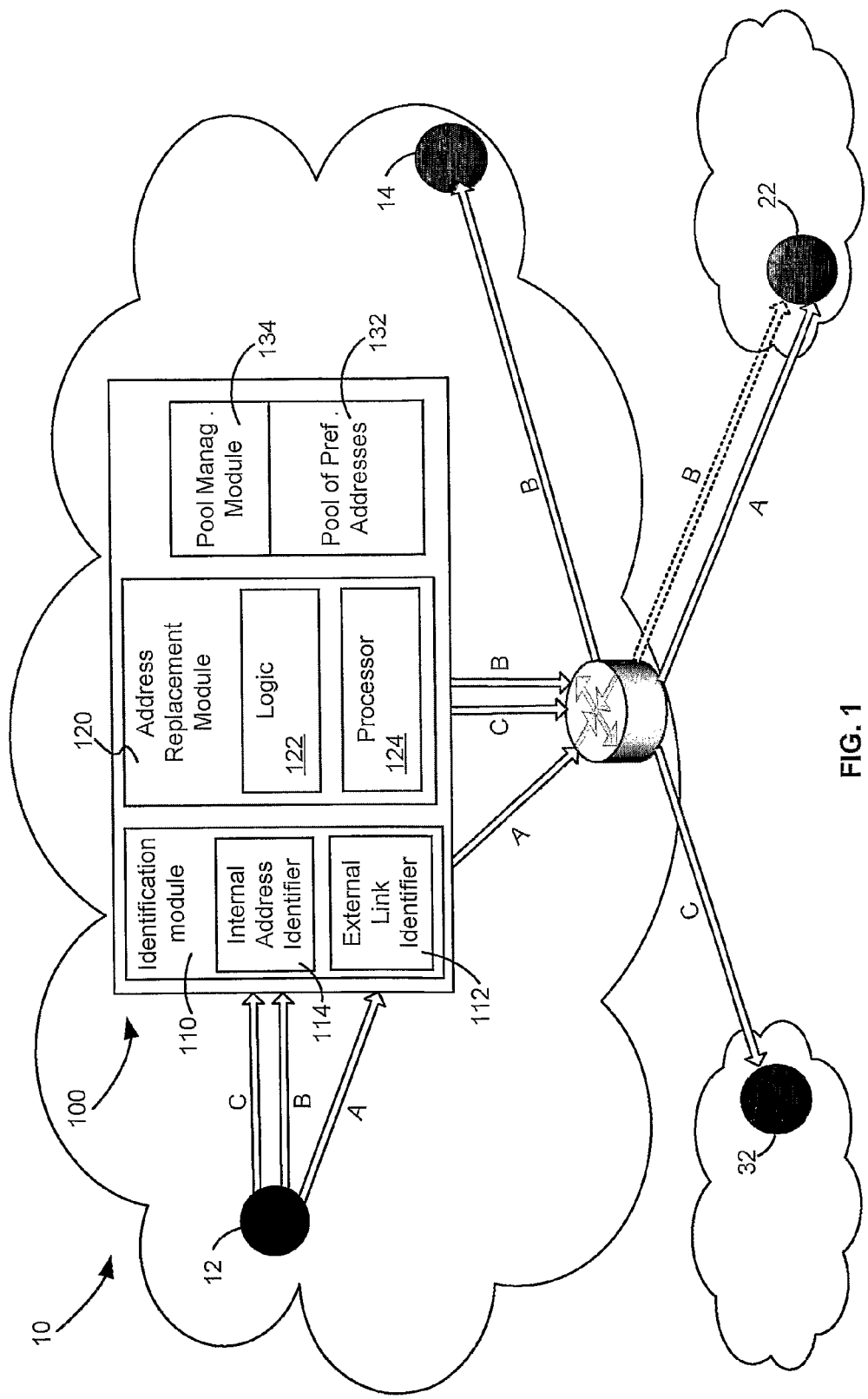
FIG. 1 is a block diagram illustration of an apparatus for managing communications arriving from or to a node connected to a specified portion of a network, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EXEMPLARY EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims reference is made to the term "specified portion of a network" and similar terms. The term "specified portion of a network" or the like is used to refer to a group (two or more) of computers or nodes whose connection with other portions of the network may be controlled. Non-limiting examples of specified portions of a network may include ISPs' networks, corporate networks, and other network which constitute a specified portion of the Internet.

The present invention provides a method and an apparatus for managing communications arriving from or to a node connected to a specified portion of a network, the apparatus comprising. Some embodiments of the present invention relate to an apparatus for managing communications arriving from or to a node connected to a specified portion of a network including an external link identifier, a pool of addresses and an address replacement module. The external link identifier is configured to identify a message which is configured to enable requested content to be exchanged between the node and at least one other node which is external to the specified portion of the network. The pool of addresses is adapted to implement content insensitive criteria for determining which addresses to include in the pool. The address replacement module is adapted to implement a content insensitive replacement policy for determining whether an address included in the identified message should be replaced, such that if in accordance with the replacement policy it is determined that the address should be replaced, a replacement address is selected from the pool of addresses. According to the present invention, the selection of the replacement address is insensitive to the content of the message and to the content of the replacement address.

Further embodiments of the invention relate to an apparatus for managing communications arriving from or to a node connected to a specified portion of a network including an external link identifier, a pool of internal addresses and an address replacement module. The external link identifier is configured to identify a message which is configured to enable requested content to be exchanged between the node and at least one other node which is external to the specified portion of the network. The pool of addresses is adapted to implement content insensitive criteria for determining which internal addresses to include in the pool. The address replacement module is adapted to implement a content insensitive replacement policy for determining whether an external address included in the identified message should be replaced, such that if in accordance with the replacement policy it is determined that the external address should be replaced, a internal replacement address is selected from the pool of internal addresses. According to the present invention, the selection of the replacement address from the pool of internal address is insensitive to the content of the message and to the content of the replacement address.

Reference is now made to FIG. 1, which is a block diagram illustration of an apparatus 100 for managing communications arriving from or to a node 12 connected to a specified portion of a network 10, according to some embodiments of the invention. According to some embodiments the present invention the apparatus 100 may be operatively connected to one or more nodes which belong to a specified portion of the network 10. For convenience, here, the apparatus 100 is shown to be connected to internal node 12. The apparatus 100 may include an external link identifier 112 adapted for identifying messages which are configured to enable requested content to be exchanged between an internal node 12 and at least one other node which is external to the specified portion of the network 10, for example, with node 22. Content exchange as referred to herein relates to the exchange of content to or from the internal nodes from or to one or more of the external nodes. It would be appreciated, that any content exchange between an internal node and an external node may require the use of an external link for establishing and allowing the content exchange.

According to some embodiments of the invention, the external link identifier 112 may be configured to monitor messages originating from internal nodes to identify messages which are configured to enable requested content to be exchanged between an internal node and an external node (or nodes). According to further embodiments of the invention, the external link identifier 112 may be configured to also monitor messages from external nodes which arrive at the specified portion of the network 10 to identify messages which are configured to enable requested content to be exchanged over an external link.

According to some embodiments of the present invention, as part of monitoring messages, the external link identifier 112 may be adapted to read a header of a monitored message, and based on the data in a message's header, the external link identifier 112 may be adapted to determine whether the message is configured to enable requested content to be exchanged. Further in accordance with the data in a message's header, the external link identifier 112 may be adapted to determine whether that message is configured to enable a content exchange between an internal node and an external node. It would be appreciated that the message's header may not contain data with respect to the message's content, and that reading a message's header will not expose the external link identifier 112 to the content of the message.

According to some embodiments of the present invention, the external link identifier 112 may be configured to identify only certain types of messages which are known to be associated with content exchanges. If a message which does not belong to one of the types of messages which the external link identifier 112 is configured to monitor, the external link identifier 112 may be configured to allow it to proceed to its original destination unchanged. Such types of messages may include, for example, messages which are associated with particular protocols which are known to be used for enabling content to be exchanged between nodes. Thus, for example, when message A arrives to the external link identifier 112, the external link identifier 112 may check the message's header to determine whether the message belongs to one of the message types that it is configured to identify. If the external link identifier 112 determines that the message does not belong to one of the types it is configured to identify, the external link identifier 112 may allow the message (message A) to proceed to its original destination unchanged. The external link identifier 112 may monitor the messages traffic either alone or in combination with filters and/or other network components which may be included in the apparatus 100 or which may be associated with the apparatus 100.

If however, the external link identifier 112 identifies a message as being configured to enable requested content to be exchanged over an external link, the external link identifier 112 may forward the message or certain data about the message to an address replacement module 120, as is the case for example with messages B and C. The address replacement module 120 may be adapted to determine whether one or more addresses included in the identified message should be replaced in accordance with a content insensitive replacement policy. The replacement policy may be comprised of one or more replacement rules. The address replacement module 120 may include any suitable logic 122 as may be necessary for implementing the replacement policy. The address replacement module 120 may include a processor 124 capable of executing the logic 122 and performing various actions in accordance with instructions received from the logic 122.

According to embodiments of the invention, the address replacement module 120 may use the replacement policy to determine if and when an address included in an identified message should be replaced. The replacement policy may be insensitive to the message's content, such that the decision whether or not to replace an address may be arrived at without becoming exposed to the content of the message. According to further embodiments of the invention, the address replacement module 120 and the replacement policy utilized by it may relate to information found in the header of a message, and the address replacement module 120 may not access the content of the message. Thus, the address replacement module 120 may not become exposed to the actual content or payload of the message.

According to some embodiments of the present invention, in accordance with an exemplary replacement policy, by default, the address replacement module 120 may be configured to replace an address included in an identified message if the address belongs to a certain portion of the network. According to further embodiments of the present invention, in accordance with a further exemplary replacement policy, by default, the address replacement module 120 may be configured to replace an address included in an identified message if the address is external to the specified portion of the network 10.

In accordance with yet another exemplary replacement policy, an address included in an identified message is to be replaced, unless the address is located within a specified portion of the network, or if the identified message follows in close proximity a previously identified message from the same source, wherein the proximity is determined by a predefined time threshold. The source of a message may be determined in accordance with data found in its header. The address replacement module 120 may be adapted to log certain data with respect to each identified message, as will be described in greater detail below. The address replacement module 120 may be adapted to use data with respect to previously identified messages to determine whether an address included in an identified message should be replaced.

For example, in FIG. 1, identified messages B and C both include the address of external nodes, message B includes the address of external node 22 and message C includes the address of external node 32. In the embodiment illustrated by FIG. 1, in accordance with the relevant replacement policy implemented by the address replacement module 120, by default, an external address included in an identified message should be replaced. Further in accordance with the replacement policy implemented in FIG. 1, an external node included in an identified message should not be replaced if the identified message follows in close proximity a previously identified message from the same source, in this case from node 12, wherein the proximity is determined by a predefined time threshold. For message B, the address replacement module 120 does not have data or records with respect to a previous identified message(s) from node 12, and therefore, in accordance with the default rule of the replacement policy, the address of external node 22 is replaced, in this case with the address of internal node 14. Thus, instead of being routed to external node 22, identified message B is rerouted to internal node 14. On the other hand, in accordance with the embodiment of the invention illustrated in FIG. 1, when message C is identified the address replacement module 120 finds data with respect to a previous identified message from 12 (this data relates to message B). Thus, in accordance with the replacement policy implemented in FIG. 1, the address replacement module 120 may proceed to determine whether the identified message C follows in close proximity a previously identified message B from the same source (node 12). In the embodiment of the invention shown in FIG. 1, the address replacement module 120 does indeed determine that message C follows in close proximity previously identified message (message B) arriving at the apparatus 100 from the same source (node 12), and therefore, in accordance with the replacement policy, the apparatus 100 will not replace the address of external node 32. Thus, in this case, the address replacement module 120 allows message C to proceed to its original destination unchanged.

In accordance with another exemplary replacement policy, an external address included in an identified message is to be replaced, unless the address was included in a previous message which was recently identified, as determined by a predefined time threshold. In accordance with yet another exemplary replacement policy, an address included in an identified message is to be replaced, unless the address is located within a certain portion of the network, or if the identified message follows in close proximity a certain number of identified messages from the same source and the previous identified message was identified within a predefined period of time. In accordance with yet another exemplary replacement policy, an address included in an identified message is to be replaced, unless the address is located within a certain portion of the network, or in case the average interval between the identified message and previously identified messages (one or more) received from the same source is less than a predefined threshold.

According to some embodiments of the present invention, the address replacement module 120 may be configured to operate in several (two or more) modes. In each mode, the address replacement module 120 may be adapted to implement a different replacement policy. For example, the address replacement module 120 may be configured to operate in a normal operating mode and in a refresh operating mode. In the normal operating mode, the address replacement module 120 may be configured to implement a certain replacement rule, for example, one of the replacement rules described above with reference to an exemplary replacement policy, and while in the refresh operating mode the address replacement module 120 may apply a replacement policy in accordance with which, the same or other replacement rule is applied on only some percentage of identified messages. The address replacement module 120 may be configured to switch between modes either routinely, for example, during certain time periods, or in response to certain triggers. The triggers for switching the address replacement module 120 between modes may be associated, for example, with performance parameters of the specified portion of the network with which the apparatus is associated, with performance parameters of the apparatus, etc. It would be appreciated the modes of the address replacement module 120 are not limited for any particular purpose, although various modes may be aimed at achieving certain results.

According to some embodiments of the present invention, in case the apparatus includes more than one pool of preferred address, each pool may be associated with a different replacement policy. For example, the replacement policies may differ from one another by their thresholds. In accordance with farther embodiments of the invention, if more than one replacement rule is implemented by the address replacement module 120, the replacement policies may be mutually exclusive, such that if a certain address complies with one replacement policy, it does not comply with any other replacement policy. In order to provide mutually exclusive replacement policies, each replacement policy may be associated with a unique range which, if the parameters associated with the address to be replace fall within, the address shall be replaced.

It would be appreciated that these examples of replacement rules are insensitive to the content of the message. It would be further appreciated that these examples of replacement rules are non-exhaustive and those of ordinary skill in the art may devise other content insensitive replacement rules, including but not limited to, rules which are based or associated with the exemplary rules provided above.

If in accordance with the replacement rule, the address replacement module 120 determines that an address included in an identified message should be replaced, the address replacement module 120 may be configured to select the replacement address from a pool of preferred addresses 132. The address replacement module 120 may be configured to select the replacement address from the pool 132, such that the selection is insensitive to the content of the message.

As mentioned above, the pool of preferred addresses 132 may include addresses whose inclusion in the pool is insensitive to their content. According to some embodiments of the invention, the inclusion of an address in the pool 132 may be manual or may be performed automatically, based upon a predefined preferred address criterion or criteria. According to some embodiments of the invention, the apparatus 100 may include a pool management module 134 configured for creating and managing the pool 132 (or pools in case of more than one pool). According to some embodiments of the invention, the pool management module 134 may use a preferred address criterion\a which is insensitive to content to add and remove preferred addresses to and from the pool 132. As mentioned above, the apparatus 100 may include several (for example, two) pools of preferred addresses, in which case a specific preferred address criterion\a will be associated with each of the pools, and the inclusion of an address in any of the pools may by preformed either manually or in accordance with its preferred address criterion\a.

For convenience purposes, in the following description, instead of referring to a specified portion of a network, reference shall be made, by way of example, to an ISP's network. It should be noted however, that the present invention is not limited in this respect. Rather, embodiments of the present invention are applicable, unless stated otherwise, to any group (two or more) of computers or nodes whose connection with other portions of the network may be controlled, and an ISP's network is one example of such a group of nodes.

Further for purposes of convenience, in the following description, instead of referring in general to a message which is configured to enable requested content to be exchanged between the node and at least one other node, reference shall be made, by way of example, to a P2P session initiation message(s). A P2P session initiation message as referred to herein includes any message which pertains to any presently know or yet to be devised in the future peer-to-peer protocol, and which is intended for initiating a data exchange session between two or more peers. It would be appreciated that different types of P2P protocols employ different session initiation messages for initiating a data exchange session between the peers. Unless stated otherwise, a P2P session initiation message as referred to herein, includes any type of session initiation message whose header includes data with respect to addresses of two or more nodes between which the session initiation message is configured to cause content to be exchanged.

Figure 2:
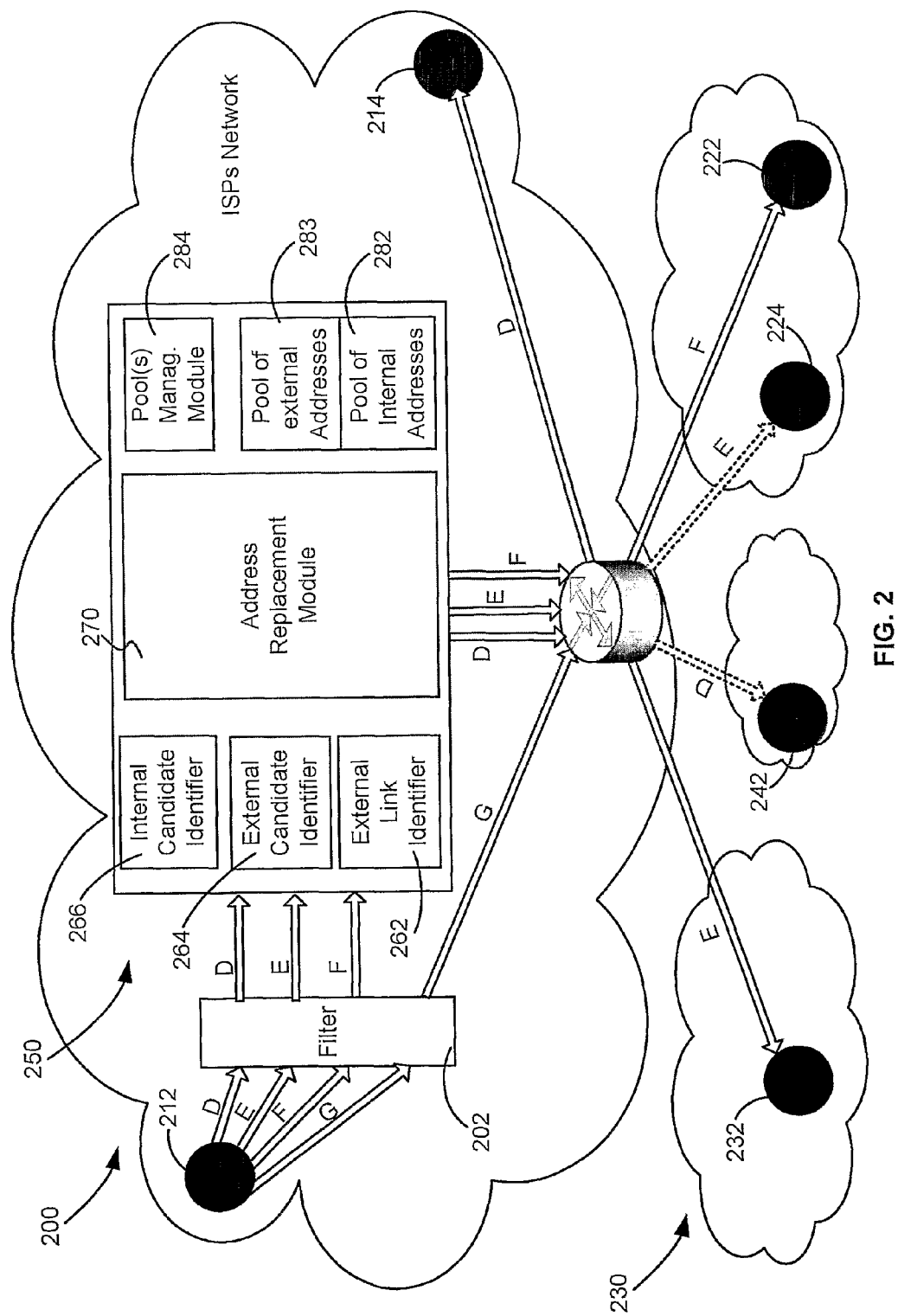
FIG. 2 is an illustration of certain aspects of managing communications arriving from a node connected to an ISP's network, according to some embodiments of the invention.

As mentioned above, content exchanges via P2P protocols are responsible for a substantial portion of Internet traffic. It would be appreciated that by identifying P2P session initiation messages which are configured to enable content exchange between a node located within the ISP's network and at least one other located outside the ISP's network According to some embodiments of the present invention, an apparatus may be provided for managing communications arriving from or to a node or nodes connected to an ISP's network, wherein the ISP's network corresponds to the specified portion of the network which was discussed above. Reference is now made to FIG. 2, which is an illustration of certain aspects of managing communications arriving from or to a node connected to an ISP's network, according to some embodiments of the invention. In FIG. 2, for convenience, the apparatus 250 is connected to internal node 212. However, the invention is not limited in this respect. For example, in accordance with further embodiments of the invention, the apparatus 250 may be associated with all the nodes located within the ISP's network 200.

In accordance with some embodiments of the invention, the apparatus 250 may be operatively connected to a filter 202. The filter 202 may be connected to the apparatus 250, such that any message from any of the nodes which are associated with the apparatus 250 must first pass through the filter 202. In FIG. 2, the filter 202 is connected between the apparatus 250 and the node 212 associated with the apparatus 250. The filter 202 may be adapted to monitor the output of node 212, and may be configured to monitor all outgoing messages from node 212, regardless of their destination. According to some embodiments of the invention, from amongst the monitored messages, the filter 202 may be adapted to intercept messages which are associated with P2P protocols. According to further embodiments of the invention, the filter 202 may be adapted to intercept P2P session initiation messages. The filter 202 may be configured to determine whether a certain message is a session initiation message by reading the message's header. As mentioned above, a P2P session initiation message is configured to cause content to be exchanged between two nodes. It should be appreciated that although the filter 202 is shown in FIG. 2 as being external to the apparatus 250, according to other embodiments of the present invention, the filter 202 may be implemented within and as part of the apparatus 250.

According to some embodiments of the present invention, the apparatus 250 may be configured to identify P2P session initiation messages which belong to any P2P protocol whose session initiation messages are configured to cause content to be exchanged between two or more nodes. According to further embodiments of the present invention, the apparatus 250 may be configured to identify P2P session initiation messages which belong to any P2P protocol which employs session initiation messages for causing content to be exchanged between two or more nodes whose address is included in the message, for example, in the message's header. According to yet further embodiments of the present invention, the apparatus 250 may be configured to, but not limited to, handle and identify a P2P session initiation message which belongs to any of the following P2P protocols: FastTrack™, Gnutella™, Gnutella2™, eDonkey™, Soulseek™, Blubster™. However, according some embodiments of the present invention, the apparatus 250 may be configured to identify and handle session initiation messages belonging to any presently known or yet to be devised in the future P2P protocol which employs session initiation messages for causing content to be exchanged, and according to further embodiments of the invention, to identify and handle session initiation messages belonging to any presently known or yet to be devised in the future P2P protocol which employs session initiation messages for causing content to be exchanged between two or more nodes whose address is included in the message.

According to some embodiments of the present invention, messages which are not intercepted by the filter 202, for example, messages which do not comply with the interception criterion\a implemented by the filter 202 are allowed to proceed substantially uninterrupted. For example, in FIG. 2 message G is not a session initiation message and therefore it is allowed to pass through the filter 202 substantially uninterrupted to proceed to its original external destination address, which is associated in this case with node 222.

The apparatus 250 may be operatively connected to the filter 202, such that only messages which were intercepted by the filter 202 are received at the apparatus 250. Thus, the apparatus 250 may receive only P2P session initiation messages. Upon receiving a message from the filter 202, the message or certain data relating to the message may be input to the external link identifier 262. The external link identifier 262 may be adapted to identify messages which are configured to enable requested content to be exchanged between an internal node and an external node (or nodes).

It would be appreciated that in accordance with various P2P protocols, data with respect to the nodes between which content is to be exchanged may be contained in the header of a session initiation message which is associated with the content exchange. According to some embodiments of the present invention, as part of identifying a message which is configured to enable content to be exchanged over an external link, the external link identifier 262 may read the header of the message. According to an embodiment of the invention, since P2P session initiation messages are configured to enable content to be exchanged, and since the filter 202 is configured to allow only P2P session initiation messages to reach the apparatus 250, the external link identifier 262 may be adapted to determine that a certain message received at the apparatus 250 is configured to enable content to be exchanged between an internal node, such as node 212, for example, and an external node based upon the data in the message's header. According to further embodiments of the invention, the external link identifier 262 may be configured to identify a message as being configured to cause content to be exchanged over an external link, if the message's header includes all address of a node which is external to the ISP's network 200.

According to some embodiments of the invention, if the address replacement module 262 does not identify a P2P session initiation message as being configured for causing content to be exchanged over an external link, for example, since the message does not include an external address in its header, the address replacement module 262 may be configured to allow the message to proceed to its original destination unchanged. However, if the address replacement module 262 identifies a P2P session initiation message as being configured for causing content to be exchanged over an external link, the address replacement module 262 may be configured to forward the identified message or certain data with respect to the identified message to an address replacement module 270, as is the case, for example, with messages D, E and F. In FIG. 2, message D includes the address of external node 242, message E includes the address of external node 224 and message F includes the address of external node 222.

The address replacement module 270 may be adapted to determine whether an address or addresses included in an identified P2P session initiation message should be replaced in accordance with a content insensitive replacement policy. Some examples of various replacement policies which may be implemented by the address replacement module 270 were provided above. As already mentioned above, according to embodiments of the invention, the address replacement module 270 may use the replacement policy to determine if and when an address included in an identified P2P session initiation message should be replaced. The address replacement module 270 and the replacement policy utilized by it, may relate to information found in the header of an identified P2P session initiation message, and the address replacement module 270 may not access the content of the message. Thus, the address replacement module 270 may not become exposed to the actual content or payload of an identified P2P session initiation message.

According to some embodiments of the present invention, the apparatus 200 may include at least one pool of replacement addresses. In the embodiment shown in FIG. 2, two pools 282 and 283 are included in the apparatus 200. The first pool 282 is a pool of internal addresses, and the second pool 283 is a pool of external addresses. According to embodiments of the invention, the inclusion of an address in either of the pools 282 and 283 may be insensitive to the content of the address.

According to some embodiments of the invention, the apparatus 200 may include a pools management module 284. The pools management module 284 may be adapted to create and manage each of the first and the second pools 282 and 283. According to further embodiments of the present invention, each of the first and the second pools 282 and 283 may be associated with a different preferred address criterion\a. The pool management module 284 may be configured to determine whether a candidate address should be included in the first or the second pool 282 and 283 in accordance with the preferred address criterion\a with which each of the pools 282 is 283 are associated. In the exemplary embodiment illustrated by FIG. 2, the first pool 282 is a pool of internal addresses and the second pool 283 is a pool of external addresses. In accordance with the criteria associated with the first pool 282, a candidate address for the first pool 282 is an address which is included within a P2P session initiation message and which is within the ISP's network 200. In accordance with the criteria associated with the second pool 283, a candidate address for the second pool 283 is an address which is included within a P2P session initiation message and which is within a certain portion of the network (other than the ISP's network 200), in this case within network 230. The certain portion of the network 230 to which the criteria associated with second pool relates 283 may be, for example, a network of another ISP (or other organization) with which external links are relatively cheap. It should be noted however, that the invention is not limited in this respect. Those of ordinary skill in the art may readily notice how to provide many other pools which are associated with various other criteria.

As is shown, for example in FIG. 2, according to some embodiments of the present invention, the apparatus 250 may include an internal candidate identifier 266. The internal candidate identifier 266 may be configured to receive from the filter 202 messages which have been intercepted by the filter 202 or data with respect to such messages. As mentioned above, the filter 202 may be configured to intercept P2P session initiation messages from node 212. The internal candidate identifier 266 may be configured read the header of a message intercepted by the filter 202, or corresponding data, to determine whether the header includes an internal address. If at least one internal address is found in the intercepted message, the internal candidate identifier 266 may forward the data with respect to the candidate address to the pools management module 284. The pools management module 284 may utilize further criteria to determine whether the candidate address should be added to the pool 282. For example, the pools management module 284 may check whether the candidate address is already included in the pool 282. According to embodiments of the present invention, the process described herein for the inclusion of an address in the pool 282 may be insensitive to the address's content.

Further as shown in FIG. 2, the apparatus 250 may include an external candidate identifier 264. The external candidate identifier 264 may be configured to receive from the filter 202 messages, or data with respect to messages, which have been intercepted by the filter 202. As mentioned above, the filter 202 may be configured to intercept P2P session initiation messages from node 212. The external candidate identifier 264 may be configured to read the header of a message intercepted by the filter 202, or corresponding data, to determine whether the header includes an external address which is within a certain portion of the network 230. If at least one address from within that certain portion of the network 230 is found, the internal candidate identifier 266 may forward the data with respect to the candidate address to the pools management module 284. The pools management module 284 may utilize further criteria for determining whether the candidate address should be added to the pool 283, prior to the inclusion thereof in the pool 283. According to embodiments of the present invention, the entire process of including an address in the pool 283 may be insensitive to the address's content.

According to some embodiments of the present invention, each of the pools 282 and 283 may be associated with a unique replacement policy, which is mutually exclusive with respect to the other replacement policy(ies). The address replacement module 270 may implement the policy replacement policies to determine whether an address included in an identified message should be replaced, and also, to determine from which pool 282 and 283 to select the replacement address.

For convenience and simplicity of illustration, in the embodiments illustrated in FIG. 2, in accordance with the replacement policies implemented by the address replacement module 270, an external address included in an identified message (P2P session initiation message) should be replaced, by default, by an address from the pool of internal address 282. Further in accordance with the address replacement policies implemented by the address replacement module 270, an external address included in an identified message (P2P session initiation message) should be replaced with an address from the pool of external addresses 283, if the identified message follows a previously identified message from the same source, in this case from node 212, and the time interval between the identified message and the previously identified message is less than a first threshold. Finally, in accordance with the address replacement policies implemented by the address replacement module 270, an external address included in an identified message (P2P session initiation message) should not be replaced and the identified message should be allowed to proceed to its original destination without being modified, if the identified message follows at least two previously identified messages from the same source, in this case from node 212, and the time interval between each identified message and it predecessor is less than a second threshold.

Messages D, E and F, illustrate the application of the above exemplary replacement policies. P2P session initiation message D which is the first of the three to arrive at the apparatus 250 is determined to include an address which is external to the ISP's network 200, for example, the address of node 242. Upon receiving data with respect to message D, the address replacement module 270 may determine with which of the replacement policies message D complies. Since at the time of identifying message D the address replacement module 270 is not aware of any preceding identified messages from the same source (node 212), the default replacement policy is implemented by the address replacement module 270, and a replacement address is selected from the pool of internal addresses 282 for replacing the external address included in message D. Subsequently, message D is rerouted in accordance with the internal replacement address, in this case to internal node 214.

P2P session initiation message E which arrives at the apparatus 250 shortly after message D was identified, is determined to include an address which is external to the ISP's network 200, for example, the address of node 224. Upon receiving data with respect to message E, the address replacement module 270 may determine with which of the replacement policies message E complies. Since message E follows a previously identified message from the same source, in this case message D, and the interval between the identified message E and the previously identified message D is less than the first threshold, the address replacement module 270 determines that the external address included in message E, in this case the address of external node 224, is to be replaced with an external address selected from the pool of external addresses 283, and in this case with the address of external node 232. Subsequently, message E is rerouted in accordance with the external replacement address, in this case to external node 232.

P2P session initiation message F which arrives at the apparatus 250 shortly after message E was identified, is determined to include an address which is external to the ISP's network 200, for example, the address of node 222. Upon receiving data with respect to message F, the address replacement module 270 may determine with which of the replacement policies message F complies. Since message F follows two previously identified messages from the same source, in this case messages D and E, and the interval between each identified message and it predecessor (in this case between F and E, and between E and D) is less than a second threshold, the address replacement module 270 determines that the identified message F should be allowed to proceed to its original destination, in this case to external node 222, without being modified.

According to some embodiments of the invention, the address replacement module 270 may be adapted to store data with respect to an identified message in a hash table, or in any other suitable data structure. The hash table may be stored on a storage device (not shown) associated with the address replacement module 270. According to some embodiments of the invention, the replacement module 270 may be adapted to consult the hash table to determine whether an address included in an identified message should be replaced or not.

Reference is now mode to FIG. 3, which is a graphical illustration of a hash table which may be used by the address replacement module to store data with respect to identified messages, according to some embodiments of the invention. According to some embodiments of the invention, the hash table may be a fixed size table. The hash table includes a fixed number of hash value entries, for example, as is shown in FIG. 3, the table may include up-to 9 entries. Each has value in the table may represent one or more nodes from which an identified message was received. Each hash value may correspond to the result of a hash function, when applied, for example, by the address replacement module, to the IP address of the nodes from which the identified message was received.

According to further embodiments of the invention, in the hash table, for each hash value entry, a timestamp may be stored. The timestamp stored in connection with a certain hash value may correspond to the time when the most recent message from a node whose address corresponds to that hash value was identified. According to further embodiments of the invention, the hash table may further include for each hash value an entry counter value. The counter value parameter may correspond to the number of messages received from a node whose address corresponds to the hash value, which have been identified within a predetermined period from the identification of a previously identified message from a node whose address corresponds to the same hash value. Thus, for example, whenever a message from a node whose address corresponds to a certain hash value is identified and it is determined that the message was identified within a predetermined period from the identification of a previously identified message from a node whose address corresponds to same hash value, the counter is incremented by 1.

According to some embodiments of the present invention, the address replacement module 270 may be configured to determine if an address included in an identified message should be replaced in accordance with the timestamp and/or in accordance with the counter associated with the hash value which corresponds to the address of the node from which the address was received. According to further embodiments of the invention, the address replacement module 270 may be adapted to reset the counter associated with a certain hash value if the counter exceeds a predefined value. According to some embodiments of the present invention, the address replacement module 270 may be adapted to reset the counter associated with a certain hash value, after, in accordance with the replacement policy, the address replacement module 270 allowed a message from a node whose address corresponds to the hash value to proceed to its original destination, for example, to an external node. In accordance with one exemplary scenario, if a certain node repeatedly generates messages to enable it to exchange content with another node, and the apparatus 250 seems to have failed to provide alternative destinations to enable the requested content exchange, the node should be allowed to make the requested connection.

It is also possible to implement the hash table using a global counter as a virtual clock instead of timestamps. For every identified message from a node whose address corresponds to a certain hash value the counter associated with that hash value is incremented.

In the typical case, each entry in the table may possibly represent more than one address, and thus correspond to two or more different nodes, particularly, if the size of the hash table is substantially small with respect to the number of nodes associated with the apparatus 250. Thus, the address replacement module 262 may not be aware of a specific node, since the nodes are represented by hash value which may be shared by two and even more nodes. However, if the hash function is intelligibly selected, it may be possible to achieve relatively uniform distribution of hash function values, thereby reducing the probability of a single hash value being shared by two different nodes.

Figure 4:
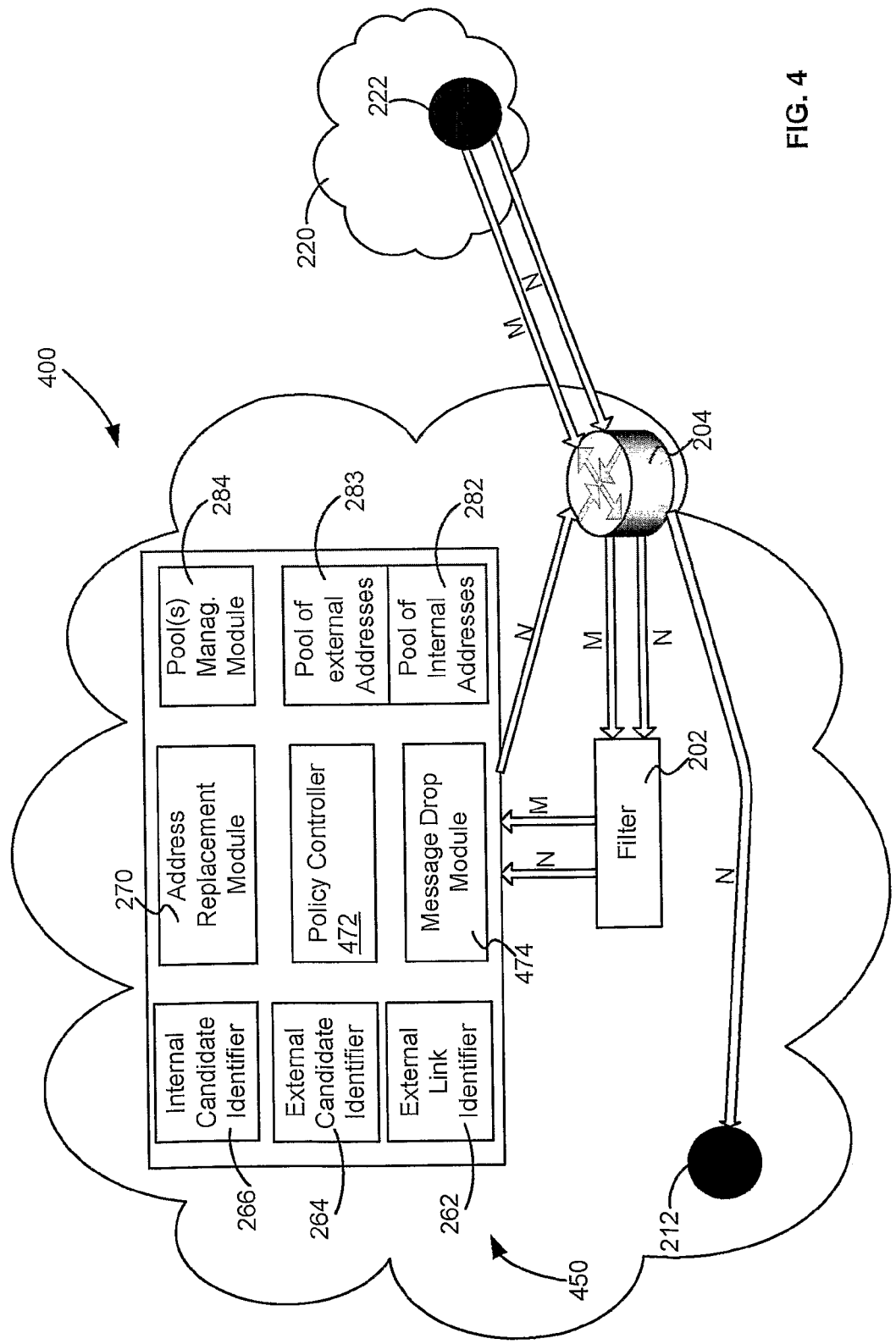
FIG. 4 is an illustration of certain aspects of managing communications arriving to a node connected to an ISP's network, according to some embodiments of the invention.

Reference is now made to FIG. 4, which is an illustration of certain aspects of managing communications arriving from or to a node connected to an ISP's network, according to some embodiments of the invention. In FIG. 4, for convenience, the apparatus 450 is connected to router 204, through which messages enter an ISP's network 400. However, the invention is not limited in this respect. For example, in accordance with further embodiments of the invention, the apparatus 450 may be associated with all the nodes located within the ISP's network 400.

In accordance with some embodiments of the invention, the apparatus 450 may be operatively connected to a filter 202. The filter 202 may be connected to the apparatus 250, such that any message from any of the nodes which are associated with the apparatus 250 must first pass through the filter 202. In FIG. 4, the filter 202 is connected between the apparatus 250 and the router 204 associated with the apparatus 250. The filter 202 may be adapted to monitor the output of route 204, and may be configured to monitor all outgoing messages from node 204. Since router 204 receives all incoming messages arriving at the ISP's network, the filter 202 may be configured to monitor all incoming traffic. According to some embodiments of the invention, from amongst the monitored messages, the filter 202 may be adapted to intercept messages which are associated with P2P protocols. According to further embodiments of the invention, the filter 202 may be adapted to intercept P2P session initiation messages. The filter 202 may be configured to determine whether a certain message is a session initiation message by reading the message's header. As mentioned above, a P2P session initiation message is configured to cause content to be exchanged between two nodes.

According to some embodiments of the present invention, the filter 202 may be configured to forward an intercepted message or data with respect to an intercepted message to the apparatus 450. Upon receiving a message from the filter 202, the message or certain data relating to the message may be input to the external link identifier 262. The external link identifier 262 may be adapted to identify messages which are configured to enable requested content to be exchanged between an internal node and an external node (or nodes). According to some embodiments of the present invention, as part of identifying a message which is configured to enable content to be exchanged over an external link, the external link identifier 262 may be configured to read the header of the message. According to an embodiment of the invention, since P2P session initiation messages are configured to enable content to be exchanged, and since the filter 202 is configured to allow only P2P session initiation messages to reach the apparatus 250, the external link identifier 262 may be adapted to determine that a certain message received at the apparatus 450 is configured to enable content to be exchanged between an internal node and an external node, such as node 222, for example, based on the data in the message's header.

In accordance with some embodiments of the present invention, upon identifying a message as being configured to enable content to be exchanged between an internal node and an external node, the apparatus 450 may utilize a policy controller 472. The policy controller 472 may be configured to determine whether the source of an identified message is located within the ISP's network 400 or whether it is an external node. According to further embodiments of the invention, the policy controller 472 may be configured to determine whether the identified message is configured to cause content to be exchanged from a node located within the ISP's network 400 to an external node, or whether the identified message is configured to enable content to be exchanged from en external node to a node located within the ISP's network 400. The policy controller 472 may be configured to determine the source of an identified message based upon data found in the header of the identified message. According to further embodiments of the invention, the policy controller 472 may be configured to read an identified message's header, and based on the data found in the identified message's header the policy controller 472 may be configured to determine whether the source of the identified message is within the ISP's network 400 or whether it is an external node.

In accordance with some embodiments of the present invention, once the policy controller 472 determines the source of the identified message, the policy controller 472 may be configured to implement either an address replacement module 270 or a message drop module 474. According to some embodiments of the invention, the policy controller 472 may be adapted to select to implement the address replacement module 270 in case it is determined that the source of the identified message is within the ISP's network 400, and may select to implement the message drop module 474 if the source of the identified message is external to the ISP's network 400. According to further embodiments of the present invention, the policy controller 472 may be adapted to select to implement the address replacement module 270 in case it is determined that the identified message is configured to cause content to be exchanged from a node located within the ISP's network 400 to an external node, and may select to implement the message drop module 474 if the identified message is configured to enable content to be exchanged from en external node to a node located within the ISP's network 400.

An example of operation of the address replacement module 272 was provided above. The message drop module 474 may be configured to determine whether the identified message should be dropped or not. If the message drop module determines that the identified message should be dropped, the message drop module 474 may instruct the apparatus to drop the identified message. According to further embodiments of the invention, in case the message drop module 474 determines that the identified message should not be dropped, the apparatus 450 may be configured to allow the identified message to continue to its original destination substantially unmodified.

According to some embodiments of the present invention, the message drop module 474 may implement a predetermined drop policy for determining when to drop a message and when to allow a message to proceed to its destination. The message drop module 474 and the drop policy utilized by it, may relate to information found in the header of an identified P2P message, and the drop policy module 474 may not access the content of the message. Thus, the address drop module 474 may not become exposed to the actual content or payload of an identified message. According to some embodiments of the present invention, the apparatus may include a hash table, similar to the hash table which was described above with reference to FIG. 3, and the drop replacement module 474 may be configured to determine whether or not to drop an identified message in accordance with the data in the hash table which is associated with the identified message, or the lack thereof.

According to an exemplary drop policy which may be implemented by the message drop module 474, by default, an identified message is to be dropped. Further according to an exemplary drop policy which may be implemented by the message drop module 474, an identified message is to be dropped, unless it is determined that the identified message follows a predefined number (one or more) of previously identified messages from the same source, in this case from external node 222, and the interval between each identified message and it predecessor is less than a certain threshold. It would be appreciated, that according to some embodiments of the invention, the data with respect to the previous identified messages from the same source may be provided by a hash table entry which is associated with a hash value which corresponds to the address of the node of interest, in this case of external node 422. It would be further appreciated, that in some cases (typically relatively rare) data with respect to other node(s) may be mixed with the data with respect to node of interest due to the nature of hash values. However, as mentioned above, such occurrences are relatively scant.

In FIG. 4, messages M and N illustrate the application of the exemplary drop policy. Message M which arrives at the apparatus from external node 222, is thus directed to the message drop module 474. Upon receiving data with respect to message M, the message drop module 474 may determine whether to drop the identified message M or to allow the message to proceed to its original destination. In this case, since at the time of identifying message M the message drop module 474 is not aware of any preceding identified messages from the same source (node 222), the default drop policy is implemented, and message M is dropped. On the other hand, message N which arrives at the apparatus 450 shortly after message N was identified (and dropped), follows previously identified message from the same source, in this case message M, and the interval between the identified message N and the previously identified message M is less than the first threshold, and thus in accordance with the drop policy implemented by the message drop module 474, message N is allowed to proceed to its original destination, in this case to internal node 212, substantially without being modified.

It would be appreciated that the drop policy described above is exemplary in nature. It would be further that according to some embodiments of the invention, an appropriate drop policy may be implemented by the message drop module 474, such that an external node seeking to connect with an internal node for downloading data from the internal node is repeatedly denied connection, unless the external node insists on connecting to an internal node, in which case, the message drop module 474 will eventually allow the message to reach a node located within the ISP's address.

It would be appreciated that the replacement policy(ies) and/or the drop policy(ies) may be modified from time to time or may be switched to predefined modes to modify the replacement policy(ies) and/or the drop policy(ies). The triggers for such modifications may include, but are not limited to, triggers associated with a network's performance parameters, predefined periods of time, etc.

According to some embodiments of the invention, a message received at the apparatus may be a response to a session initiation message. A response to a session initiation message is a type of message used by certain types of P2P protocols, for example, by BitTorrent™. A response to a session initiation message is usually used for responding to a node which transmitted a session initiation message which belongs to the P2P protocols supporting responses to session initiation messages. A response message to the session initiation message typically includes a list of addresses with which the node may seek connection to download requested content. Thus, a response to a session initiation message may be configured to cause requested content to be exchanged between a node located within a specified potion of a network and an external node, and may be identified by an apparatus according to some embodiments of the present invention as such.

According to some embodiments of the invention, an apparatus for managing communications arriving from or to a node connected to a specified portion of a network may be configured to identify a response to a P2P session initiation message which is configured to enable requested content to be exchanged between the node and at least one other node which is external to the specified portion of the network. According to some embodiments of the invention, the apparatus may handle a response message to a P2P session initiation messages operate substantially as described above with respect to session initiation messages, with the exception that in case the apparatus identifies a message as being a response message to a P2P session initiation message, the apparatus may be configured to access the content of the response message to determine whether the response message is configured to enable requested content to be exchanged between an internal node and an external node, and/or for other reasons. It would be appreciated that while, in case the message is a response message the apparatus may access its content, the content of the response message may not contain data with respect to the request content, and may include only data with respect to addresses without any specific reference to the data stored in these addresses. Thus, the apparatus may be configured to handle response messages substantially as described above without becoming exposed to the content which is sought to be exchanged nor to any specific content stored in any node.

According to some embodiments of the invention, a message received at the apparatus may be a session initiation forwarding message. A session initiation forwarding message is a type of message used by certain types of P2P protocols, for example, by Gnutella™, and by other P2P protocols. A session initiation forwarding message is usually used for forwarding a session initiation message from a node which received a session initiation message which belongs to the P2P protocols supporting session forwarding messages or from a node which itself received a session initiation forwarding message. Typically a forwarding message is used for forwarding a session initiation message which the node that is the source of the forwarding message could not service itself. However, the criteria used for deciding when to forward a session initiation message is beyond the scope of the present invention. Thus, a session initiation forwarding message may be configured to cause requested content to be exchanged between a node located within a specified potion of a network and an external node, and may be identified by an apparatus according to some embodiments of the present invention as such.

According to some embodiments of the invention, the apparatus may be adapted to identify a forwarding message as such, for example, based upon data found in the message's header. Upon identifying a message as being a forwarding message, the apparatus may be adapted to extract from the forwarding message data with respect to the session initiation message which is being forwarded. The apparatus may be configured, such that when identifying a forwarding message, the session initiation message being forwarded is considered as the identified message, rather than the forwarding message.

Accordingly, some embodiments of the present invention may also be applicable and possibly beneficial, for example, to hierarchical P2P protocols, in which a Super Node is configured to forward a session initiation message for exchanging content it cannot provide itself. For example, in some protocols when a Super Node receives a search request and the requested content is not listed in its index, the Super Node will forward the request to another Super Node. Again, if the other Super Node didn't find the requested content, the original Super Node will forward the request to another Super Node and so on, the process continues until it tried a predefined number of Super Nodes. For the first attempts to forward the request to a different Super Node, the apparatus may be configured to divert the forwarded message to a local Super Node and not to an external Super Node which was originally requested. However, after K attempts (K is either predefined or actively being learned by the system) the apparatus may be configured to allow the session initiation message to proceed to its desired destination.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for routing a message, the method comprising:
  receiving a message specifying an exchange of requested content between at least two nodes of a network, wherein the at least two nodes have respective addresses, and wherein the message is received from a source;

evaluating an address replacement criteria based, at least in part, on one of the respective addresses, without reference to the requested content, wherein the address replacement criteria comprises the message is configured to cause the requested content to be exchanged over an external link of the network, and wherein the replacement criteria further comprises the message does not follow a previously identified message from the same source within a specified time interval;

if the address replacement criteria is satisfied, replacing the one of the respective addresses with a replacement address of another node of the network, wherein the replacement address is selected from a pool of replacement addresses, wherein the pool of replacement addresses includes a plurality of replacement addresses selected without regard to content stored at the plurality of replacement addresses, and wherein said replacing the one of the respective addresses with a replacement address results in a modified message configured to cause the requested content to be exchanged without use of the external link.

2. The method according to claim 1, further comprising: if the address replacement criteria is not satisfied, allowing the message to continue to one of the respective addresses.

3. The method according to claim 1, wherein the message comprises a session initiation message.

4. The method according to claim 3, wherein the session initiation message comprises a peer-to-peer (P2P) session initiation message.

5. The method according to claim 1, wherein the message comprises a response to a session initiation message.

6. The method according to claim 1, wherein the message comprises a session initiation forwarding message.

7. The method according to claim 1, further comprising storing data with respect to the received message in a hash table.

8. The method according to claim 7, wherein the data stored in the hash table with respect to the message does not include an identification of the requested content.

9. The method according to claim 1, wherein the message comprises a first message and wherein the method further comprises:
creating the pool of addresses at least in part by receiving at least a second message specifying an another exchange of requested content between another at least two addresses in the network; and
adding at least one of the another at least two addresses in the network to the pool of addresses.

10. The method according to claim 9, wherein said creating the pool of addresses occurs without accessing the requested content specified by the second message.

11. The method according to claim 1, wherein the message includes a header and a payload including an identification of the requested content, and wherein said evaluating an address replacement criteria based, at least in part, on one of the respective addresses, without reference to the requested content further comprises accessing the header of the message without accessing the payload including the identification of the requested content.

12. The method according to claim 1, wherein the address replacement criteria further comprises at least one of the respective addresses in a network belongs to a specific portion of the network.

13. The method according to claim 1, wherein the address replacement criteria further comprises at least one of the respective addresses in a network is external to a specific portion of the network, and wherein the pool of replacement addresses includes only addresses internal to the specific portion of the network.

14. A method for routing a message, the method comprising:
receiving a message specifying an exchange of requested content between at least two nodes of a network, wherein the at least two nodes have respective addresses, and wherein the message is received from a source
evaluating an address replacement criteria based, at least in part, on one of the respective addresses, without reference to the requested content, wherein the address replacement criteria comprises the message is configured to cause the requested content to be exchanged over an external link of the network, and wherein the replacement criteria further comprises
the message and a certain number of previously received messages from the same source were received within a set time interval;
if the address replacement criteria is satisfied, replacing the one of the respective addresses with a replacement address of another node of the network, wherein the replacement address is selected from a pool of replacement addresses, wherein the pool of replacement addresses includes a plurality of replacement addresses selected without regard to content stored at the plurality of replacement addresses, and wherein said replacing the one of the respective addresses with a replacement address results in a modified message configured to cause the requested content to be exchanged without use of the external link.

15. The method according to claim 14, further comprising: if the address replacement criteria is not satisfied, allowing the message to continue to one of the respective addresses.

16. The method according to claim 14, wherein the message comprises a session initiation message.

17. The method according to claim 16, wherein the session initiation message comprises a peer-to-peer (P2P) session initiation message.

18. The method according to claim 14, wherein the message comprises a response to a session initiation message.

19. The method according to claim 14, wherein the message comprises a session initiation forwarding message.

20. The method according to claim 14, further comprising storing data with respect to the received message in a hash table.

21. The method according to claim 20, wherein the data stored in the hash table with respect to the message does not include an identification of the requested content.

22. The method according to claim 14, wherein the message comprises a first message and wherein the method further comprises:
creating the pool of addresses at least in part by receiving at least a second message specifying an another exchange of requested content between another at least two addresses in the network; and
adding at least one of the another at least two addresses in the network to the pool of addresses.

23. The method according to claim 22, wherein said creating the pool of addresses occurs without accessing the requested content specified by the second message.

24. The method according to claim 14, wherein the message includes a header and a payload including an identification of the requested content, and wherein said evaluating an address replacement criteria based, at least in part, on one of the respective addresses, without reference to the requested content further comprises accessing the header of the message without accessing the payload including the identification of the requested content.

25. The method according to claim 14, wherein the address replacement criteria further comprises at least one of the respective addresses in a network belongs to a specific portion of the network.

26. The method according to claim 14, wherein the address replacement criteria further comprises at least one of the respective addresses in a network is external to a specific portion of the network, and wherein the pool of replacement addresses includes only addresses internal to the specific portion of the network.

27. An apparatus for routing a message, the apparatus comprising:
a computing system configured to receive a message specifying an exchange of requested content between at least two nodes of a network, wherein the at least two nodes have respective addresses, and wherein the message is received by the computing system from a source;
at least one memory encoded with a pool of replacement addresses including a plurality of replacement addresses selected without regard to content stored at the plurality of replacement addresses, and wherein the pool of replacement addresses includes only addresses internal to a specific portion of the network; and
a computer-readable medium having instructions stored thereon that, if executed by the computing system, cause the computing system to perform operations comprising: evaluating an address replacement criteria based, at least in part, on one of the respective addresses, without reference to the requested content, wherein the address replacement criteria comprises the message is configured to cause the requested content to be exchanged over an external link of the network, at least one of the respective addresses is external to the specific portion of the network, and the message does not follow a previously identified message from the same source within a specified time interval, and, if the address replacement criteria is satisfied, to replace the one of the respective addresses with a replacement address selected from the pool of replacement addresses, wherein said replacing the one of the respective addresses with a replacement address results in a modified message configured to cause the requested content to be exchanged without use of the external link.

28. The apparatus according to claim 27, wherein the instructions, if executed by the computing system, further cause the computing system to, if the replacement criteria is not satisfied, allow the identified message to continue to one of the at least two addresses.

29. The apparatus according to claim 27, wherein the message comprises a session initiation message.

30. The apparatus according to claim 29, wherein the session initiation message comprises a peer-to-peer (P2P) session initiation message.

31. The apparatus according to claim 27, wherein the message comprises a response to a session initiation message.

32. The apparatus according to claim 27, wherein the message comprises a session initiation forwarding message.

33. The apparatus according to claim 27, wherein the messages is a first message and wherein the computing system is configured to receive a plurality of messages and configured to read a header of individual ones of the plurality of messages to identify the first message specifying an exchange of requested content between the at least two nodes of a network.

34. The apparatus according to claim 27, wherein the replacement criteria further comprises, by default, the computing system is adapted to determine that an address which is associated with a node located outside the specified portion of the network, should be replaced.

35. The apparatus according to claim 27, further comprising a hash table coupled to the computing system and configured to store data with respect to the received message.

36. The apparatus according to claim 35, wherein the data stored in the hash table with respect to the message does not include an identification of the requested content.

37. The apparatus according to claim 27, wherein the message includes a header and a payload including an identification of the requested content, and wherein the instructions, if executed by the computing system, further cause the computing system to access the header of the message without accessing the payload including the identification of the requested content.

38. The apparatus according to claim 27, wherein the instructions, if executed by the computing system, further cause the computing system to select the plurality of replacement addresses, wherein the message is a first message, and wherein the computing system is configured to receive at least a second message specifying another exchange of requested content between another at least two addresses in the network, and wherein the instructions, if executed by the computing system, further cause the computing system to add at least one of the another at least two addresses in the network to the pool of addresses.

39. An apparatus for routing a message, the apparatus comprising:
a computing system configured to receive a message specifying an exchange of requested content between at least two nodes of a network, wherein the at least two nodes have respective addresses, and wherein the message is received by the computing system from a source;
at least one memory encoded with a pool of replacement addresses including a plurality of replacement addresses selected without regard to content stored at the plurality of replacement addresses; and
a computer-readable medium having instructions stored thereon that, if executed by the computing system, cause the computing system to perform operations comprising: evaluating an address replacement criteria based, at least in part, on one of the respective addresses, without reference to the requested content, wherein the address replacement criteria comprises the message is configured to cause the requested content to be exchanged over an external link of the network, and wherein the replacement criteria further comprises the message and a certain number of previously received messages from the same source were received within a set time interval and, if the address replacement criteria is satisfied, to replace the one of the respective addresses with a replacement address selected from the pool of replacement addresses, wherein said replacing the one of the respective addresses with a replacement address results in a modified message configured to cause the requested content to be exchanged without use of the external link.

40. The apparatus according to claim 39, wherein the instructions, if executed by the computing system, further cause the computing system to, if the replacement criteria is not satisfied, allow the identified message to continue to one of the at least two addresses.

41. The apparatus according to claim 39, wherein the message comprises a session initiation message.

42. The apparatus according to claim 41, wherein the session initiation message comprises a peer-to-peer (P2P) session initiation message.

43. The apparatus according to claim 39, wherein the message comprises a response to a session initiation message.

44. The apparatus according to claim 39, wherein the message comprises a session initiation forwarding message.

45. The apparatus according to claim 39, wherein the messages is a first message and wherein the computing system is configured to receive a plurality of messages and configured to read a header of individual ones of the plurality of messages to identify the first message specifying an exchange of requested content between the at least two nodes of a network.

46. The apparatus according to claim 39, wherein the replacement criteria further comprises, by default, the computing system is adapted to determine that an address which is associated with a node located outside the specified portion of the network, should be replaced.

47. The apparatus according to claim 39, further comprising a hash table coupled to the computing system and configured to store data with respect to the received message.

48. The apparatus according to claim 47, wherein the data stored in the hash table with respect to the message does not include an identification of the requested content.

49. The apparatus according to claim 39, wherein the message includes a header and a payload including an identification of the requested content, and wherein the instructions, if executed by the computing system, further cause the computing system to access the header of the message without accessing the payload including the identification of the requested content.

50. The apparatus according to claim 39, wherein the instructions, if executed by the computing system, further cause the computing system to select the plurality of replacement addresses, wherein the message is a first message, and wherein the computing system is configured to receive at least a second message specifying another exchange of requested content between another at least two addresses in the network, and wherein the instructions, if executed by the computing system, further cause the computing system to add at least one of the another at least two addresses in the network to the pool of addresses.

51. A non-transitory computer readable medium encoded with executable instructions, the instructions comprising:
 instructions for receiving a message specifying an exchange of requested content between at least two nodes of a network, wherein the at least two nodes have respective addresses, and wherein the message is received from a source;
 instructions for evaluating an address replacement criteria based, at least in part, on one of the respective addresses, without reference to the requested content, wherein the address replacement criteria comprises the message is configured to cause the requested content to be exchanged over an external link of the network, and wherein the replacement criteria further comprises the message and a certain number of previously received messages from the same source were received within a set time interval; and
 instructions for, if the address replacement criteria is satisfied, replacing the one of the respective addresses with a replacement address of another node of the network, wherein the replacement address is selected from a pool of replacement addresses, wherein the pool of replacement addresses includes a plurality of replacement addresses selected without regard to content stored at the plurality of replacement addresses, wherein said replacing the one of the respective addresses with a replacement address results in a modified message configured to cause the requested content to be exchanged without use of the external link.

52. The non-transitory computer readable medium according to claim 51, wherein the message comprises a session initiation message.

53. The non-transitory computer readable medium according to claim 52, wherein the session initiation message comprises a peer-to-peer (P2P) session initiation message.

54. The non-transitory computer readable medium according to claim 51, wherein the message comprises a response to a session initiation message.

55. The non-transitory computer readable medium according to claim 51, wherein the message comprises a session initiation forwarding message.

56. The non-transitory computer readable medium according to claim 51, further comprising instructions for storing data with respect to the received message in a hash table.

57. The non-transitory computer readable medium according to claim 56, wherein the data stored in the hash table with respect to the message does not include an identification of the requested content.

* * * * *

UNITED STATES PATENT AND TRADEMARK OFFICE
CERTIFICATE OF CORRECTION

| | | |
|---|---|---|
| PATENT NO. | : 8,103,749 B2 | Page 1 of 1 |
| APPLICATION NO. | : 11/794766 | |
| DATED | : January 17, 2012 | |
| INVENTOR(S) | : Dolev et al. | |

It is certified that error appears in the above-identified patent and that said Letters Patent is hereby corrected as shown below:

Column 2, lines 6-7, delete "network, the apparatus comprising." and insert -- network. --.

Column 3, lines 64-65, delete "network, the apparatus comprising." and insert -- network. --.

Column 7, line 50, delete "farther" and insert -- further --.

Column 8, line 58, delete "network" and insert -- network. --.

Column 10, line 31, delete "all" and insert -- an --.

Column 12, line 49, delete "it" and insert -- its --.

Signed and Sealed this
Twenty-seventh Day of March, 2012

David J. Kappos
*Director of the United States Patent and Trademark Office*